(12) United States Patent
Varriano-Marston et al.

(10) Patent No.: US 8,237,084 B2
(45) Date of Patent: Aug. 7, 2012

(54) LASER MICROPERFORATED FRESH PRODUCE TRAYS FOR MODIFIED/CONTROLLED ATMOSPHERE PACKAGING

(75) Inventors: Elizabeth Varriano-Marston, Windham, NH (US); Roland Meijer, Groton, MA (US); Eugene P. Thomas, Santa Cruz, CA (US)

(73) Assignee: Taylor Fresh Foods, Inc., Salinas, CA (US)

( * ) Notice: Subject to any disclaimer, the term of this patent is extended or adjusted under 35 U.S.C. 154(b) by 1271 days.

(21) Appl. No.: 11/955,502

(22) Filed: Dec. 13, 2007

(65) Prior Publication Data
US 2008/0149604 A1 Jun. 26, 2008

Related U.S. Application Data

(60) Provisional application No. 60/871,516, filed on Dec. 22, 2006.

(51) Int. Cl.
*B23K 26/00* (2006.01)
(52) U.S. Cl. .......... 219/121.72; 219/121.71; 219/121.7; 219/121.67; 219/121.83
(58) Field of Classification Search .............. 219/121.72, 219/121.71, 121.7, 121.67, 121.82, 121.83, 219/121.85; 206/557; 428/34.1, 35.1; 426/237, 426/238
See application file for complete search history.

(56) References Cited

U.S. PATENT DOCUMENTS

| | | | |
|---|---|---|---|
| 3,751,873 A * | 8/1973 | Toby ................................ 53/493 |
| 4,842,875 A | 6/1989 | Anderson |
| 4,879,078 A | 11/1989 | Antoon, Jr. |
| 4,910,032 A | 3/1990 | Antoon, Jr. |
| 4,923,650 A | 5/1990 | Antoon, Jr. et al. |
| 4,923,703 A | 5/1990 | Antoon, Jr. |
| 5,042,540 A * | 8/1991 | Gorlich .......................... 141/174 |
| 5,341,824 A * | 8/1994 | Fletcher et al. ............... 131/281 |
| 5,832,699 A | 11/1998 | Zobel |
| 5,865,059 A * | 2/1999 | Alessandro ..................... 73/159 |
| 6,025,572 A * | 2/2000 | Imai et al. .................. 219/121.7 |
| 6,049,057 A * | 4/2000 | Imai et al. .................. 219/121.7 |
| 6,127,501 A * | 10/2000 | Fortuin et al. .............. 526/348.1 |
| 6,337,461 B1 * | 1/2002 | Yasuda et al. ............ 219/121.62 |
| 6,376,032 B1 * | 4/2002 | Clarke et al. .................. 428/34.7 |
| 6,441,340 B1 * | 8/2002 | Varriano-Marston ...... 219/121.7 |
| 6,528,006 B1 * | 3/2003 | Jansen .......................... 264/400 |

(Continued)

FOREIGN PATENT DOCUMENTS

EP 0351116 A2 3/1989

(Continued)

OTHER PUBLICATIONS

EP Search Report dated Apr. 8, 2008 of Patent Application No. EP 07 12 3913 filed Dec. 21, 2007.

(Continued)

*Primary Examiner* — M. Alexandra Elve
(74) *Attorney, Agent, or Firm* — Weide & Miller, Ltd.

(57) ABSTRACT

A system for laser microperforated fresh produce trays for use in modifying or controlling the flow of oxygen and carbon dioxide into and/out of a fresh produce container, where the microperforations are specifically tailored such as by size, location and number for the specific produce. The packaging system tailors microperforated trays for particular produce to optimally preserve the produce, using a method of making registered microperforations on the trays using at least some of the following: a conveyor, a thickness measuring devise, a sensor mechanism, and a laser system including optics.

24 Claims, 10 Drawing Sheets

U.S. PATENT DOCUMENTS

| | | | |
|---|---|---|---|
| 6,653,523 B1 * | 11/2003 | McCormack et al. | 604/367 |
| 6,730,874 B2 | 5/2004 | Varriano-Marston | |
| 7,083,818 B2 | 8/2006 | Pratte | |
| 7,083,837 B1 | 8/2006 | Varriano-Marston | |
| 7,093,734 B2 | 8/2006 | Garwood | |
| 7,224,447 B2 * | 5/2007 | Alexander et al. | 356/238.1 |
| 7,272,972 B2 * | 9/2007 | Lessard | 73/159 |
| 2003/0000927 A1 | 1/2003 | Kanaya et al. | |
| 2003/0110833 A1 * | 6/2003 | Jolic | 73/40 |
| 2003/0170358 A1 | 9/2003 | Garwood | |
| 2003/0182903 A1 * | 10/2003 | Garwood | 53/478 |
| 2004/0191476 A1 | 9/2004 | Wallen et al. | |

FOREIGN PATENT DOCUMENTS

| | | |
|---|---|---|
| EP | 1452263 A1 | 1/2004 |
| EP | 1616812 | 1/2006 |
| EP | 1647489 | 4/2006 |
| FR | 2783738 | 3/2000 |
| GR | 1002424 | 8/1996 |
| JP | 07204876 | 8/1995 |
| JP | 09239576 | 9/1997 |
| JP | 11049189 | 2/1999 |

OTHER PUBLICATIONS

Zagory, Devon, "An Update on Modified Atmosphere Packaging of Fresh Produce", Packaging International 117, Apr. 1998, 5 pages.

"FreshSAFE Packaging Concept for Fruits and Vegetables: Longer Shelf Life and Less Waste", Nov. 2006, [online] [Retrieved on Dec. 11, 2006] Retrieved from the internet <URL:http://www.idspackaging.com/packaging/us/News/1339/pressrelease_content.html>.

Zagory, Devon, "Advances in Modified Atmosphere Packaging (MAP) of Fresh Produce", Perishables Handling Newsletter, May 1997, pp. 2-4, Issue No. 90.

* cited by examiner

Table 1. Comparison of hole sizes with/without Thickness Measuring

Trays 17 - 25 HOLE SIZE (Microns) WHEN THICKNESS MEASURING DEVISE WAS USED

| Tray # | Hole No. in a 6-hole String (SIDE A) | | | | | | Hole No. in a 6-hole String (SIDE B with PET Symbol) | | | | | |
|---|---|---|---|---|---|---|---|---|---|---|---|---|
| | 1 | 2 | 3 | 4 | 5 | 6 | 1 | 2 | 3 | 4 | 5 | 6 |
| 17 | 167 | 167 | 167 | 167 | 167 | 150 | 167 | 167 | 167 | 167 | 167 | 167 |
| 18 | 183 | 183 | 183 | 183 | 183 | 183 | 200 | 183 | 183 | 183 | 183 | 183 |
| 19 | 183 | 183 | 167 | 167 | 167 | 167 | 200 | 200 | 200 | 200 | 200 | 200 |
| 20 | 200 | 200 | 183 | 183 | 183 | 183 | 183 | 183 | 200 | 183 | 183 | 183 |
| 21 | 200 | 200 | 200 | 200 | 200 | 183 | 183 | 183 | 183 | 183 | 183 | 183 |
| 22 | 183 | 183 | 183 | 183 | 183 | 167 | 167 | 167 | 167 | 167 | 167 | 167 |
| 23 | 183 | 183 | 183 | 183 | 183 | 183 | 167 | 167 | 167 | 167 | 167 | 150 |
| 24 | 183 | 183 | 183 | 167 | 167 | 167 | 167 | 167 | 167 | 167 | 167 | 167 |
| 25 | 183 | 183 | 183 | 167 | 167 | 167 | 200 | 200 | 200 | 200 | 200 | 200 |
| MEAN | 185 | 185 | 181 | 180 | 178 | 172 | 185 | 183 | 183 | 181 | 181 | 178 |
| STD DEV. | 10 | 10 | 10 | 11 | 12 | 12 | 15 | 14 | 14 | 13 | 13 | 17 |

Trays 26 - 35 HOLE SIZE (Microns) WHEN NO THICKNESS MEASURING DEVICE WAS USED

| Tray # | Hole No. in a 6-hole String (SIDE A) | | | | | | SIDE B (PET side) | | | | | |
|---|---|---|---|---|---|---|---|---|---|---|---|---|
| | 1 | 2 | 3 | 4 | 5 | 6 | 1 | 2 | 3 | 4 | 5 | 6 |
| 26 | 200 | 183 | 183 | 167 | 167 | 133 | 233 | 233 | 233 | 217 | 217 | 217 |
| 27 | 200 | 200 | 200 | 200 | 200 | 200 | 217 | 217 | 217 | 200 | 200 | 200 |
| 28 | 150 | 150 | 150 | 150 | 150 | 150 | 217 | 217 | 217 | 217 | 217 | 217 |
| 29 | 183 | 183 | 183 | 183 | 183 | 167 | 217 | 217 | 217 | 217 | 217 | 217 |
| 30 | 150 | 150 | 150 | 150 | 150 | 133 | 183 | 183 | 183 | 183 | 183 | 183 |
| 31 | 117 | 117 | 117 | 117 | 117 | 83 | 200 | 200 | 200 | 200 | 200 | 200 |
| 32 | 200 | 200 | 200 | 183 | 183 | 183 | 250 | 250 | 250 | 250 | 250 | 233 |
| 33 | 133 | 117 | 117 | 117 | 117 | 177 | 217 | 217 | 217 | 217 | 217 | 200 |
| 34 | 150 | 150 | 150 | 150 | 150 | 150 | 217 | 217 | 217 | 200 | 200 | 200 |
| 35 | 150 | 150 | 150 | 150 | 150 | 150 | 283 | 283 | 283 | 283 | 283 | 283 |
| MEAN | 163 | 160 | 160 | 157 | 157 | 153 | 223 | 223 | 223 | 218 | 218 | 215 |
| STD DEV. | 30 | 30 | 30 | 27 | 27 | 33 | 27 | 27 | 27 | 29 | 29 | 28 |

FIG. 7A

Table 2. Effect of laser output on microperforation size

Trays processed with laser output of 615 μsec

| Tray | Hole placement left to right (hole size in microns) | | | | |
|---|---|---|---|---|---|
| | 1 | 2 | 3 | 4 | 5 |
| 1 | 152 | 164 | 164 | 164 | 177 |
| 2 | 152 | 164 | 177 | 177 | 180 |
| 3 | 152 | 164 | 177 | 190 | 190 |
| 4 | 152 | 152 | 164 | 164 | 177 |
| 5 | 152 | 164 | 164 | 189 | 189 |
| Mean | 152 | 162 | 169 | 177 | 183 |
| Std Dev. | 0 | 5 | 7 | 13 | 6 |

Trays processed with laser output of 675 μsec

| Tray | Hole placement left to right (hole size in microns) | | | | |
|---|---|---|---|---|---|
| | 1 | 2 | 3 | 4 | 5 |
| 1 | 177 | 202 | 215 | 228 | 253 |
| 2 | 169 | 177 | 190 | 202 | 228 |
| 3 | 226 | 164 | 177 | 202 | 228 |
| 4 | 202 | 228 | 240 | 240 | 253 |
| 5 | 190 | 228 | 228 | 253 | 265 |
| Mean | 193 | 200 | 210 | 225 | 245 |
| Std Dev. | 22 | 29 | 26 | 23 | 17 |

FIG. 7B

LASER MICROPERFORATED FRESH PRODUCE TRAYS FOR MODIFIED/CONTROLLED ATMOSPHERE PACKAGING

RELATED APPLICATIONS

This application is related to U.S. Pat. Nos. 6,441,340; 6,730,874; and 7,083,837, and claims priority to pending U.S. Application Ser. No. 60/871,516, filed Dec. 22, 2006. Each of these patents is herein incorporated in their entirety by reference.

FIELD OF THE INVENTION

The present invention relates generally to the field of packaging for respiring or biochemically active agricultural products and commodities such as fresh fruits, fresh vegetables, fresh herbs, and flowers (herein referred to collectively as produce or fresh produce) and more particularly to registered microperforations in plastic trays for use in modifying or controlling the flow of oxygen and carbon dioxide into and/or out of a fresh produce container.

BACKGROUND OF THE INVENTION

The quality and shelf life of many food products is enhanced by enclosing them in packaging that modifies or controls the atmosphere surrounding the product. Increased quality and longer shelf life result in fresher products for the consumer, less waste from spoiled produce, better inventory control, and appreciable overall savings for the food industry at both the retail and wholesale levels.

An additional aspect of improved packaging relates to the safety of the respiring produce. Improperly packaged fresh produce provides a more fertile place for various bacteria and other harmful agents to reside. Recent news reports highlight this safety issue as illness and even death can occur from tainted produce commonly used in restaurants and sold in stores.

Modified atmosphere packaging (MAP) and controlled atmosphere packaging (CAP) are often used interchangeably in the industry, and much confusion exists on their exact meanings. Both refer to methods to control the atmosphere in the package. In the processed foods area, MAP is considered a static method for controlling the atmosphere whereby an initial charge of a specific gas composition, e.g. 30% $CO_2$ and 70% $N_2$, is introduced into a barrier container before sealing. MAP for fresh produce does not use barrier containers. The package must be breathable, i.e. have well-defined oxygen transmission rates (OTRs) to facilitate continued aerobic respiration.

The oxygen transmission rate (OTR) of a film is expressed as cc $O_2/m^2$-day-atmosphere, where one atmosphere is 101325 kg/$ms^2$. Generally, a barrier container is one that has an OTR of <70 cc/$m^2$-day-atm. The units describing the flow of a particular gas through a film are "flux", expressed as cc/day-atm. The units applied to moisture vapor transmission ("MVTR") of a film are expressed as g $H_2O/m^2$-day-atm at 25° C., 75% RH.

For fresh produce, the primary means to extend quality and shelf life is temperature control. However, more than 50 years of evidence from industry practices on bulk storage of fresh fruits and vegetables in refrigerated controlled atmosphere storage rooms has shown that atmosphere control can contribute greatly to quality retention and shelf life. The use of MAP/CAP for fresh produce was a natural progression once packaging technology had advanced to include the production of non-barrier (often referred to in the industry as "breathable") materials.

The goal in fresh fruit and vegetable packaging is to use MAP/CAP to preserve produce quality by reducing the aerobic respiration rate but avoiding anaerobic processes that lead to adverse changes in texture, flavor, and aroma, as well as an increased public health concern. For each respiring item, there is an optimum $O_2$ and $CO_2$ level that will reduce its respiration rate and thereby, slow aging and degradation processes. Different fresh produce items have different respiration rates and different optimum atmospheres for extending quality and shelf life.

The concept of passive MAP became common with the development of packaging materials with OTRs of 1085 to 7000 cc/$m^2$-day-atm for fresh-cut salads. In passive MAP, the produce is sealed in packages made from these low barrier materials and allowed to establish its own atmosphere over time through produce respiration processes. Sometimes the package is gas-flushed with $N_2$ or a combination of $CO_2$ and $N_2$, or $O_2$, $CO_2$, and $N_2$ before sealing to rapidly establish the desired gas composition inside the package. Alternately, a portion of the air may be removed from the pack, either by deflation or evacuation, before the package is sealed, to facilitate rapid establishment of the desired gas content.

CAP of fresh produce is just a more controlled version of MAP. It involves a precise matching of packaging material gas transmission rates with the respiration rates of the produce. For example, many fresh-cut salad packages use passive MAP as described herein. If the packages are temperature-abused (stored at 6-10° C. or higher), $O_2$ levels diminish to less than 1%, and $CO_2$ levels can exceed 20%. If these temperature-abused packages are then placed back into recommended 3-4° C. storage, the packaging material gas transmission rates may not be high enough to establish an aerobic atmosphere (<20% $CO_2$, >1-2% $O_2$) so fermentation reactions cause off-odors, off-flavors, and slimy product. If the salad was in a CAP package, the $O_2$ levels would decrease and $CO_2$ levels increase with temperature abuse, but would be re-established to desired levels within a short time after the product is returned to 4° C. storage temperatures.

Today, films made from polymer blends, coextrusions, and laminate materials with OTRs of 1085 to 14,000 cc/100 $m^2$-day-atm are being used for packaging various weights of low respiring produce items like lettuce and cabbage. These OTRs, however, are much too low to preserve the fresh quality of high respiring produce like broccoli, mushrooms, and asparagus. In addition, existing packaging material OTRs for bulk quantities (>1 kg) of some low respiring produce are not high enough to prevent sensory quality changes during storage. Several approaches have been described to produce packaging materials to accommodate the higher respiration rate requirements and higher weights of a wide variety of fresh produce items.

U.S. Pat. No. 4,842,875, U.S. Pat. No. 4,923,703, U.S. Pat. No. 4,910,032, U.S. Pat. No. 4,879,078, and U.S. Pat. No. 4,923,650 describe the use of a breathable microporous patch placed over an opening in an essentially impermeable fresh produce container to control the flow of oxygen and carbon dioxide into and out of the container during storage. The breathable patch is generally produced by normal plastic extrusion and orientation processes. By way of example, a highly filled, molten plastic is extruded onto a chill roll and oriented in the machine direction using a series of rolls that decrease the thickness of the web. During orientation, micropores are created in the film at the site of the filler particles. Next, the microporous film are converted into pressure sensitive adhesive patches or heat-seal coated patches using narrow web printing presses that apply a pattern of adhesive over the microporous web and die-cut the film into individual patches on a roll. These processes typically make the cost of each patch too expensive for the wide spread use of this technology in the marketplace.

In addition, the food packer has to apply the adhesive-coated breathable patch over a hole made in the primary packaging material (bag or lidding film) during the food packaging operation. To do this, the packer must purchase hole-punching and label application equipment to install on each packaging equipment line. These extra steps not only increase packaging equipment costs, but also greatly reduce packaging speeds, increase packaging material waste, and therefore, increase total packaging costs.

An alternative to microporous patches for MAP/CAP of fresh fruits and vegetables is to microperforate polymeric packaging materials. Various methods can be used to microperforate packaging materials: cold or hot needle mechanical punches, electric spark and lasers. Mechanical punches are slow and often produce numerous large perforations (1 mm or larger) throughout the surface area of the packaging material, making it unlikely that the atmosphere inside the package will be modified below ambient air conditions (20.9% $O_2$, 0.03% $CO_2$). Equipment for spark perforation of packaging materials is not practical for most plastic converting operations, because the packaging material is typically submerged in either an oil bath or a water bath while the electrical pulses are generated to microperforate the material.

UK Patent Application No. 2 200 618 A and European Patent Application No. 88301303.9 describe one mechanical perforating method to make perforations in PVC films for produce packaging. Rods with pins embedded into the surface of the cylinder are used to punch holes in the film. For each produce item to be packaged, the rod/pin configuration is manually changed so that the number of perforation rows in the film, the distance apart of the rows, the pitch of the pins used to make the holes, and the size of the holes are adjusted to meet the specific requirements of the produce. The produce requirements are determined by laboratory testing produce packed in a variety of perforated films. There is no description of the mathematical method to determine the appropriate size or number of perforations to use with different produce items. In addition, the hole sizes claimed, 20 mm to 60 mm, would be too large to effectively control the atmosphere inside packages containing less than several kilograms of produce. Furthermore, the complicated perforation method causes lost package production time due to equipment (perforation cylinder) change-overs for different perforation patterns. In addition, description cautions that the produce should be placed in the package so that the perforations are not occluded and care should be taken to prevent taping over the perforations in the film. Since the perforations are not registered in a small area on the package, but are placed throughout the main body of the plastic film, the likelihood is greater that perforations will be occluded by the produce inside the package or by pressure sensitive adhesive labels applied on packages for marketing purposes. When holes are blocked, the principal route for gas transmission through the film is blocked which leads to anaerobic conditions and fermentative reactions. The result is poor sensory properties, reduced shelf life and possible microbiological safety concerns. Therefore, it is important that perforations be registered in a well-defined area of the package where the likelihood of their occlusion during pack-out, storage, transportation, and retail display is minimized.

The most efficient and practical method for making microperforated packaging materials for controlled atmosphere packaging of fresh produce is using lasers. U.S. Pat. No. 5,832,699, UK Patent Application 2 221 692 A, and European Patent Application 0 351 116 describe a method of packaging plant material using perforated polymer films having 10 to 1000 perforations per $m^2$ (1550 $in^2$) with mean diameters of 40 to 60 microns but not greater than 100 microns. The references recommend the use of lasers for creating the perforations, but do not describe the equipment or processes necessary to accomplish this task. They describe the limits of the gas transmission rates of the perforated film: OTR no greater than 200,000 cc/$m^2$-day-atm (12,903 cc $O_2$/100 $in^2$-day-atm), and MVTR no greater than 800 g/$m^2$-day-atm (51.6 g/100 $in^2$-day-atm). However, the OTR of a film does not define the total $O_2$ Flux (cc $O_2$/day-atm) needed by a fresh produce package to maintain a desired $O_2$ and $CO_2$ internal atmosphere based on the respiration rate of the specific produce item, the weight of the produce enclosed in the package, the surface area of the package, and the storage temperature. A 50-micron perforation has a very small surface area ($1.96 \times 10^{-9}$ $m^2$) and a low $O_2$ Flux (about 80 cc/day-atm) compared to its very high OTR (>200,000 cc $O_2$/$m^2$-day-atm). Therefore, one 50-micron perforation would exceed the OTR limit of this invention. Furthermore, fresh produce items such as fresh spinach are very susceptible to moisture that accumulates inside packages so produce weights greater than 0.5 kg requires 2-3 times more moisture vapor transmission than the described upper limit.

U.S. Pat. Nos. 6,441,340, 6,730,874, and 7,083,837 describe a method and system to register laser microperforations in defined areas on fresh produce packaging films to resolve the issue of microperforation occlusion by produce inside the package, by adjacent packages during carton casing, or by adhesive labels applied on the finished package. These patents also describe methods for accurately predicting the size and number of microperforations required by a particular weight of respiring produce at a specified temperature to maintain a pre-selected atmosphere inside the package during storage.

Within the last few years, consumer demand for recyclable and/or biodegradable packaging has encouraged fresh produce packers to increase their use of semi-rigid containers in the form of clamshells, and other pre-formed trays, including party trays. U.S. Pat. No. 7,083,837 describes the general use of laser microperforated semi-rigid trays for controlling the atmosphere inside fresh produce packages.

What is needed to address the shortcomings in the industry is a system and methodology to laser microperforate semi-rigid trays. This includes a system to microperforate on pre-formed trays at the produce packer site. Such a system allows the produce packer the flexibility to change the $O_2$ flux of the trays depending on the fresh produce items desired in the tray. Furthermore, the need for microperforated lidding film for heat-sealing the contents in the tray is eliminated by microperforating the tray rather than the lidding film. This will eliminate the produce packer's inventory of costly microperforated lidding film.

SUMMARY OF THE INVENTION

One embodiment of the invention is a laser method for microperforating semi-rigid trays for respiring foods, comprising feeding a plurality of trays onto a conveyor, measuring a thickness of at least one of said trays, and processing laser output requirements based on at least one of the following: thickness of the tray wall, power of the laser, drill time of the laser, speed of the conveyor, dimensions of the trays, and type of fresh produce. And, the method includes drilling at least one microperforation on the tray in a target region based on the laser output requirements.

The method includes variations such as the laser being a $CO_2$ laser. The laser system can be a stationary laser head, a laser with a galvanometer, or a laser with a beam splitter. Typically the laser is coupled to a computing device or controller.

In one embodiment, the system uses a vacuum conveyor. The conveyor may also include a denester and/or an accumulator. An additional feature includes sensing a position of the tray. In a further embodiment, the system performs quality control checks for the microperforation(s).

One embodiment of the invention is a system for microperforating trays, comprising a conveyor transporting the trays in a uniform manner. There is at least one position sensor sensing a position of the trays about the conveyor. A thickness measuring device is used for measuring a wall thickness of at least one of the trays, and a laser system for drilling at least one microperforation on the trays in a registered target region. A controller is coupled to the position sensor, the thickness measuring device and the laser system, and there is at least one power source coupled to the position sensor, the thickness measuring device and the laser system. In one variation, the system includes a denester coupled to the conveyor and/or an accumulator coupled to the conveyor.

The thickness measuring device can be any of the following: a mechanical arm with an inductive sensor, optical methods that determine wall thickness based on light refraction and/or reflection, optical probes that direct infrared light to a wall surface and collects and analyzes the reflected light. An additional embodiment includes an imaging system. The imaging system is coupled to a processing unit that performs quality control. Another variation includes the laser having a galvanometer for two-axis laser beam scanning.

According to one embodiment, the microperforated semi-rigid tray are produced by the process comprising feeding a plurality of trays onto a conveyor, measuring a thickness of at least one of the trays, processing laser output requirements based on at least one of the following: tray wall thickness, power of the laser, drill time of the laser, speed of the conveyor, dimensions of the trays, and type of fresh produce, and drilling at least one microperforation on the tray in a target region based on the laser output requirements.

One aspect includes wherein the microperforation can have hole sizes about approximately 110 to 400 microns. The semi-rigid tray in one embodiment has a thickness about approximately 6 to 25 mils. As detailed herein, the microperforations can provide an $O_2$ flux of about approximately 150 to 5,000,000 cc/day-atm.

The semi-rigid tray according to one aspect can be polyester, polystyrene, polypropylene, polyvinyl chloride, polyethylene, polylactic acid, cellulose-based materials, palm-based materials, and combinations thereof. In one embodiment thickness is measured manually. An addition aspect includes processing the laser output requirements based on an average thickness value. The processing of the laser output requirements can be performed on a computer or controller.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention will be readily understood by the following detailed description in conjunction with the accompanying drawings, wherein like reference numerals designate like structural elements, and in which:

FIG. 7A is a table that illustrates the effects of incorporating a thickness measuring device on the laser microperforating line showing that there is less variability in hole sizes among the various trays when the thickness measuring device is used.

FIG. 7B is a table that presents data on the effects of laser output on microperforation hole size.

DETAILED DESCRIPTION

In the following description, the units applied to terms used in reference to the $O_2$, and $CO_2$ transmission rates of a packaging material, "OTR" and "$CO_2$TR", respectively, are expressed as $cc/m^2$-day-atmosphere at 25° C., 75% RH. In the pressure units, one atmosphere (atm) is 101,325 $kg/ms^2$. The units describing the flow of a particular gas through a packaging material are "flux", expressed as cc/day-atm.

As referenced herein, trays refer to any of the trays that are used in the packaging of respiring produce, herbs, plants and related goods. Such trays may be considered rigid or semi-rigid in nature and come in a wide variety of shapes and sizes. These trays typically are plastic, however other materials such as those that are made from biodegradable materials like cellulose, corn or palm are also within the scope of the invention.

Figure 1:
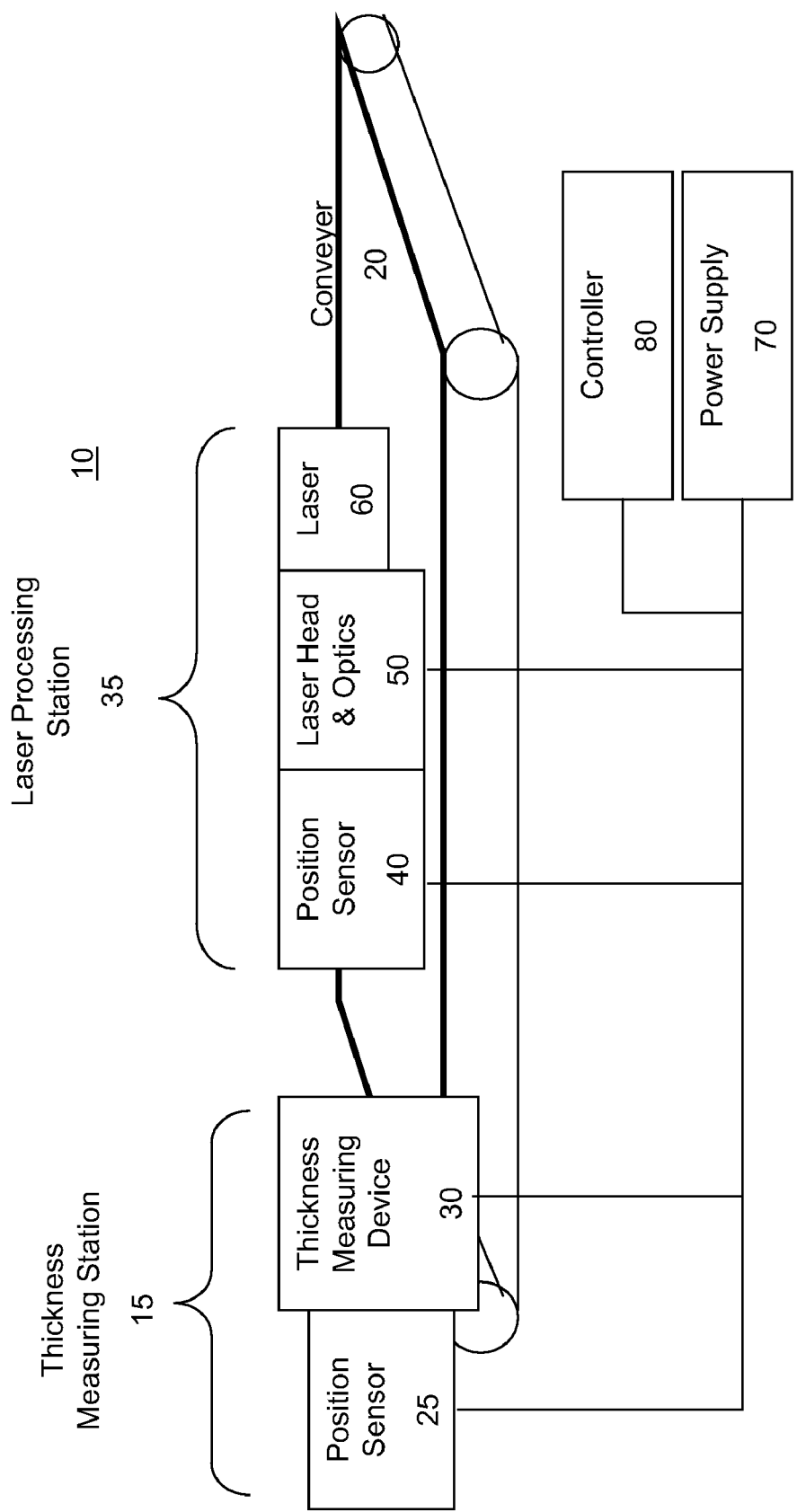
FIG. 1 depicts a laser microperforation system for trays according to one embodiment, having a conveyor, a first position sensor, a tray thickness measuring device, a second position sensor, a laser head with focusing optics, a laser, a power supply and a controller which directs the firing of the laser to produce microperforations in a target area of the tray.

Referring to FIG. 1, a laser drilling system 10 for produce packaging is coupled about a conveyor 20 wherein the system 10 in this embodiment includes a thickness measuring station 15, a laser processing station 35, the power source 70 and controller 80. The thickness measuring station 15 in this embodiment includes a first position sensor 25 and a thickness measuring device 30. The laser processing station 35 in this embodiment includes a second position sensor 40, laser head and optics 50, a sealed $CO_2$ laser 60, power supply 70, and controller 80.

In operation according to one embodiment, the trays (not shown) are fed onto the conveyor 20 with the correct orientation and the thickness of the tray wall or the selected area of the tray surface that is intended to be microperforated is measured. In this embodiment, there is a position sensor 25 associated with the thickness measuring device 30 to indicate when the tray is in position for measuring, and a mechanical arm (not shown) located on the opposite side of the conveyor 20 is used to push the tray towards the thickness measuring device 30 so as to make the tray wall accessible for measuring.

A variety of thickness measuring devices 30 can be used with this system. The thickness measuring device 30 typically communicates with the system controller 80 for the laser processing. The controller 80 uses the output from the thickness measurement to adjust the laser output required to drill the microperforations in each tray. Typically, the thicker the tray wall, the more energy that is required to produce the desired hole size. It will be readily appreciated that there may be variations in the wall thickness over the surface area of each tray and/or variations in the wall thickness between trays that arise in the tray forming process, which are otherwise acceptable for the tray's intended purpose. However, in accordance with the invention, a thickness measurement taken of the tray wall, and in some embodiments in the selected area for perforating on every tray, in advance of the laser perforating, provides the opportunity to utilize the proper laser energy level in each case. The thickness measuring device 30 thus enables the laser to reproducibly drill holes of the desired size range, tray after tray, irrespective of differences in wall thickness, and thereby produce uniform $O_2$ Flux among the trays, a necessary condition to maximize the shelf life of fresh produce sealed in those microperforated trays. In one embodiment, the tray wall selected for perforating has a flat portion which is presented to the laser head normal to the axis of the laser, such that the laser has a yet greater likelihood of successfully drilling the proper size microperforations.

An example of the effects of incorporating a thickness measuring device is shown in the data presented in Table 1 of FIG. 7A. As shown, the hole sizes are smaller and there is less variability in hole sizes among the various trays when the thickness measuring device is used as opposed to when it is not used. The use of the thickness measuring assembly in conjunction with the laser section generates more uniform holes from tray to tray and therefore, more uniform $O_2$ fluxes. Without any thickness measuring, due to the fact that tray wall thickness varies, larger holes and/or smaller holes tend to be generated, which translates into very different $O_2$ fluxes. A simple stereo microscope with an eyepiece reticule may be used to determine the size of the holes drilled in the walls of the trays.

In one embodiment, there is a user control panel, which may be a physical panel with control elements such as but not limited to rotatable knobs, levers, switches, thumbwheels, and buttons. Another embodiment integrates the control options via a computer display. The laser power (joules/µsec) can be established to a specific value for a particular type of tray. In one embodiment, a few sample thicknesses are measured to establish an approximate average of the wall thickness for a lot of trays. The amount of laser energy required for that particular wall thickness is determined by using the thickness measuring device input to the controller.

In an additional embodiment, the thickness measuring device 30 is a steel cylinder with inductive sensor and coupled about the laser microperforating line. The measurement system can be automated, semi-automated and even manual, such as using a hand caliper for a lot sample of trays.

One embodiment a thickness measuring device 30 is similar to a single-point gauge, wherein as the tray travels down the conveyor, a small steel cylinder swings against the inside wall of the tray and compresses the wall against a shuttle block in the target area to be microperforated. An induction sensor outputs an analog signal that corresponds to the distance from the shuttle block, which also corresponds to the wall thickness in the target area. Analog data is converted to a digital signal that is transferred to the controller 80 where the signal is converted into a 16-bit number. That wall thickness number is used to adjust the laser output, either up or down, based on the wall thickness so that the desired hole sizes are drilled into the tray wall.

More sophisticated optical methods that determine wall thickness based on light refraction and reflection can also be used in the tray microperforating system. One optical method uses a confocal chromatic system that focuses white light onto the wall of the tray using multi-lens optics. The white light is dispersed into monochromatic light and only the wavelength that is focused on the target area is used for the thickness measurement. The wavelength can be assigned a certain distance which, in turn, is used in calculating wall thickness. Wall thickness is based on the refractive index of the tray material and the spectral changes in the light reflected from the surface. Thickness of tray walls can also be determined using optical probes that direct infrared light to the wall surface and then collect and analyze the reflected light.

Regardless of how the thickness measurement is obtained, the measured thickness information is relayed to the laser controller 80 which in this embodiment determines the amount of laser energy required 60 as a function of wall thickness. In operation according to one embodiment, after the wall thickness in the desired target area for drilling is determined, this signals the opening of a gate to the laser drilling station that houses the laser head and focusing optics 50 and allows the tray to continue along the conveyor 20 where it is microperforated. In one embodiment there is a position sensor 40 prior to the laser head and optics 50 which signals the laser 60 to microperforate the tray in the target area.

Based on the wall thickness, the controller 80 adjusts the laser output to that is required for drilling the desired size holes for a given tray. In another embodiment, for trays determined to have an acceptably small variability in the wall thickness (±1 mil) within a batch of trays, a single setting of the laser power on the controller may be sufficient to produce uniform hole sizes from tray to tray within a single production lot of trays. In such cases, sampling measurements using a hand-held thickness gauge may be sufficient to determine the initial controller settings required for accurate laser energy requirements for drilling, without the use of a thickness measurement input or a thickness measuring device linked to the controller.

For example, if the average tray wall thickness is determined from a lot sampling of several trays or even a single lot measurement were taken, the calculated average wall thickness can be used to establish a given range about that number so that the range would cover the vast majority of the trays that are to be microperforated in that lot. Thus there would be a range of laser outputs having an upper value and a lower value and the laser processing time could be set to the upper limit value to ensure that all microperforations would be drilled in every tray even if the wall thickness was at the upper end.

In one embodiment, a vacuum conveyor is used to assure that the trays are retained in fixed position during the laser microperforating operations. The laser system is linked to a controller 80 such as a PLC (programmed logic controller) that is also linked to one or more position sensors and a thickness measuring device. Alternatively, all components could be interfaced to a computing device or system such as a personal computer (PC) or production control system that uses laser drilling software to direct the laser to microperforate the trays in a pre-selected array. Further aspects include having defined regions on the conveyor such that the position of the tray can be precisely determined and adjusted if necessary. This includes conveyor lugs, flights, guides, pockets, cavities, or similar devices that locate and retain the trays in predetermined locations on the conveyor. In such a configuration, the only remaining variable is the speed of the conveyer such that the position of the trays can be accurately determined. The individual laser 60 power requirements for this system can typically range from 10 watts to over 100 watts depending upon many variables such as the speed the conveyor is traveling, and the polymer composition and the thickness of the materials to be drilled. Faster conveyor speeds and thicker packaging materials require higher power lasers than slower speeds and thinner packaging materials. The laser head and optics 50 are typically closely coupled to the laser unit 60. The power supply 70 for the laser 60 may have certain power requirements that require a separate power conditioning unit.

It should be understood that although the various elements are shown coupled to each other and coupled to the controller 80 and the power supply 70, the coupling refers to operationally coupling wherein units that require power would be coupled to a power source. The power source 70 can be from a specific power supply assembly, from a factory outlet or a battery. Similarly, the communication and control coupling from the controller 20 to the various elements, including sensors, transducers and actuators of all types, can be a hard wired connection or can be wireless.

One example for a tray drilling system 10 consists of a 60-watt sealed beam air-cooled $CO_2$ laser with a stationary laser head with focusing optics 50, a power supply 70 and a controller 80, all mounted proximate to the conveyor 20.

Figure 2:
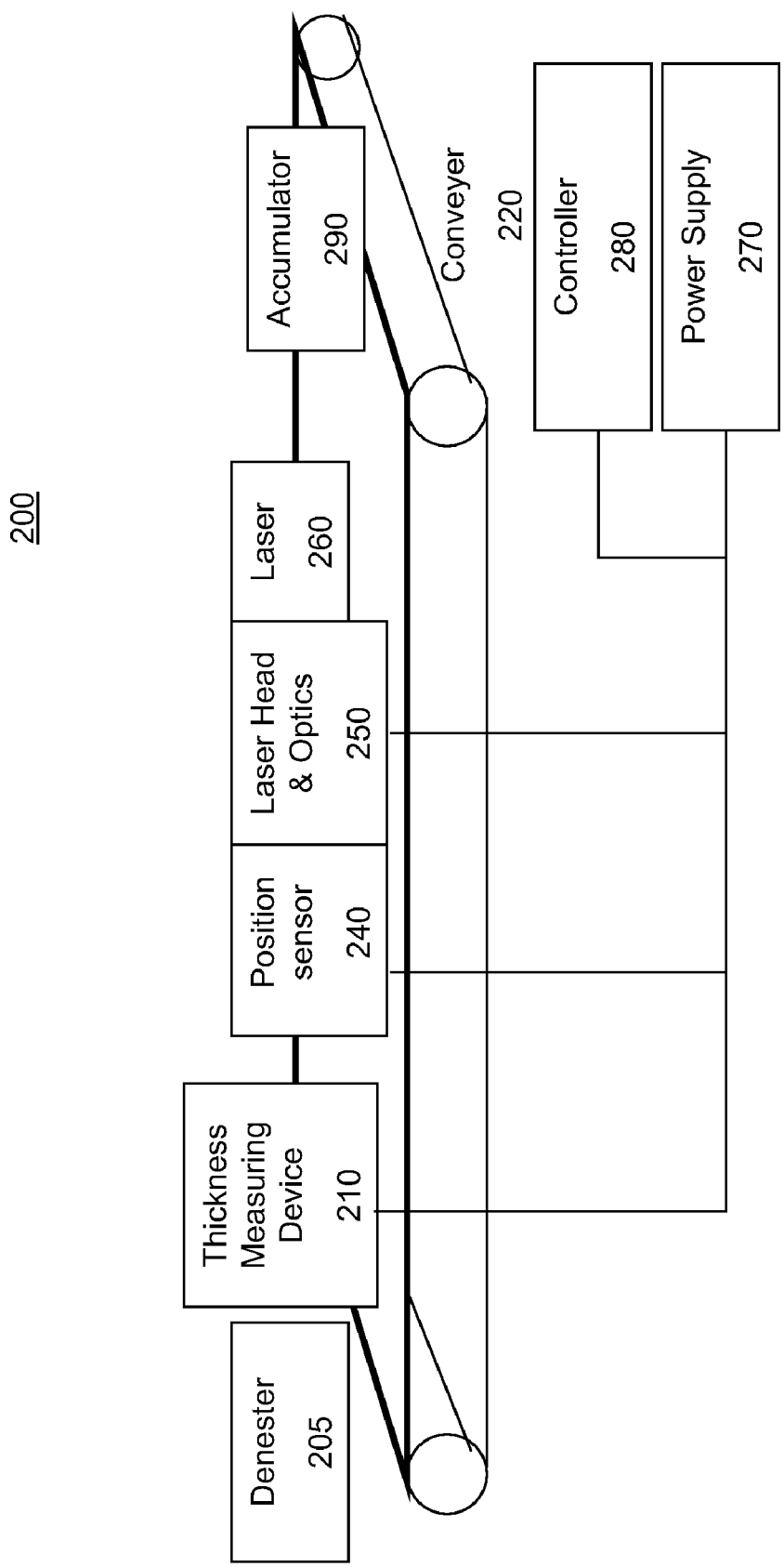
FIG. 2 depicts a laser microperforation system for trays according to another embodiment, including a conveyor with denester, a tray thickness measuring device, a position sensor, a laser head attached to a laser, a power supply and focusing optics and controller which directs the firing of the laser to produce microperforations in the target area of the tray, and an accumulator for stacking the microperforated trays as they come off the conveyor.

Referring to FIG. 2, the system 200 further includes a denester 205 proximate the feed portion of the conveyor 220 that can be used to automate the unstacking or unpacking of nested trays and feeding of the trays onto the conveyor 220. The denester 205 can place the trays in a specific location and in a consistent manner such that the location of the tray on the conveyor 220 can be controlled. At the opposing end of the microperforating system 200, an accumulator 290 can be used to remove the trays from the conveyor 220 after the trays have been microperforated.

There is no directly functioning position sensor for the thickness measuring device 210 in this embodiment however there are many ways in which the approximate position of the tray upon the conveyor can be determined. For example, the conveyor 220 can include position markers that retain the trays in position wherein markers along the conveyor trigger the thickness measuring device 210. In another embodiment, the location of the trays can be determined by having the time that a tray is placed upon the conveyor along with the speed of the conveyor, as distance (d)=velocity (v)×time (t). So whether by direct position measurement or by indirect means, it may be assured that each consecutive tray will be in the correct position at the correct time.

Figure 3:
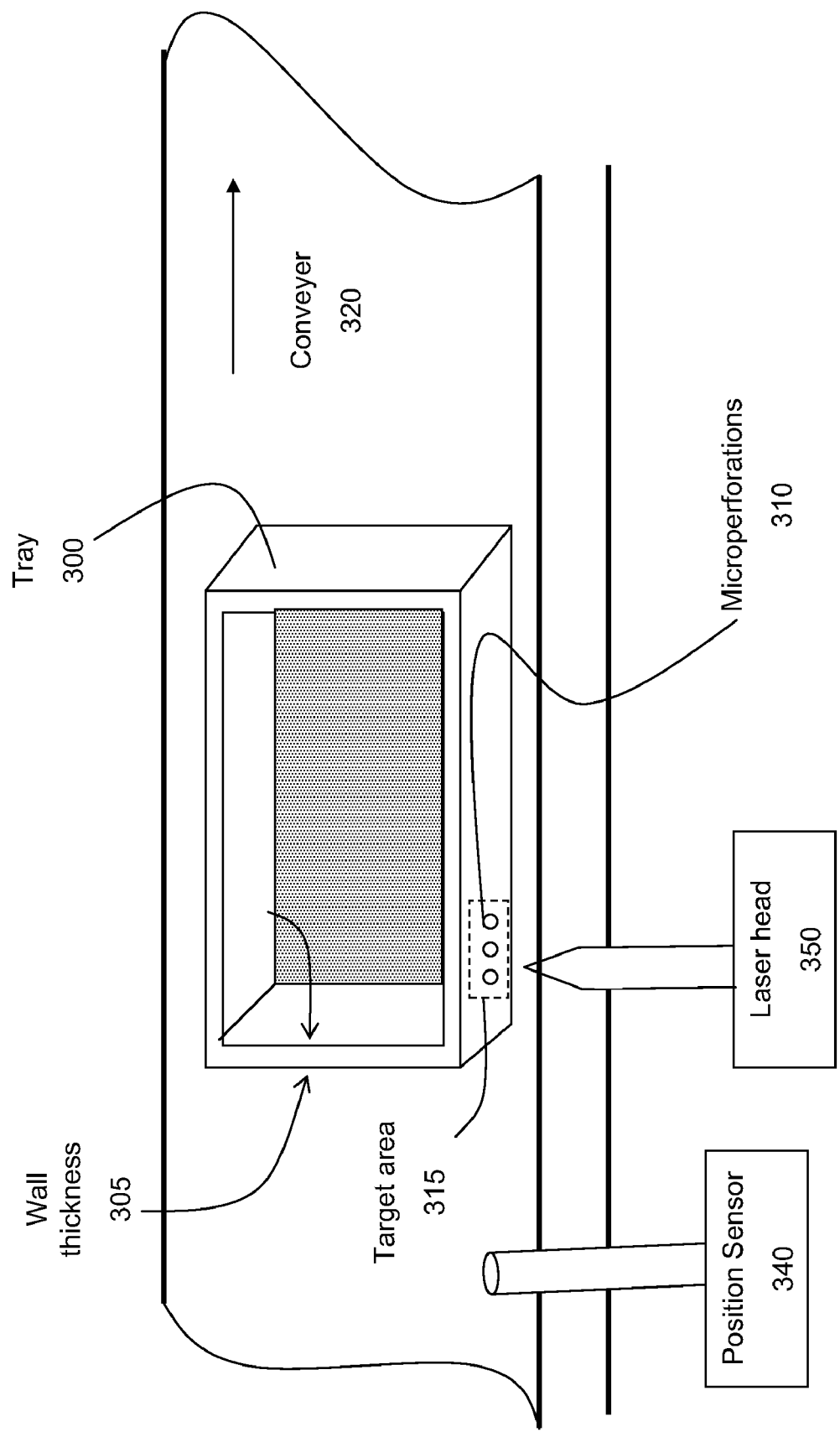
FIG. 3 shows an enlarged view of the microperforated tray showing drilled holes in the target area in accordance with one embodiment.

Referring to FIG. 3, the tray 300 is shown traveling along a conveyor 320 and having a wall thickness 305. A position sensor 340 detects the location of the tray 300 on the conveyor 320 and this signal is used by the controller (not shown) to direct the laser system (not shown) to supply the requisite amount of energy, via the laser head 350, to microperforate the tray 300. The microperforations 310 are registered in a target area 315 on the tray 305 with the appropriate number, spacing, and size according to the calculations that establish the optimum atmospheric condition for the respiring materials that are intended to be packaged.

According to one embodiment, a pre-selected number of holes 310 are drilled into the tray 300 wall, with drilling times dependent on such factors as the tray wall thickness. In one example, such features as the number of holes 310 and the desired location of the drill holes on the tray wall are predetermined by using adjustable settings on the controller panel or by a graphical user interface (GUI) on a computer display. According to one embodiment, initial settings and information may include such factors as the material composition of the tray, the size of the tray, the target area, the type of produce to be sealed in the tray, and the weight of produce. The settings can be pre-established for static tray lines or include processing means to alter parameters and perform the required processing.

Other features that can be processed by the system include the distance to the first hole (which positions the microperforations in the desired target area), the distance between holes, the number of holes to be drilled, and the laser energy (joules/μsec) required to drill the holes.

In one embodiment, the target area 315 is somewhat flat and approximately perpendicular to the laser head 350 for optimal laser drilling. A curved or concave surface can include a flattened section that will identify the target area as well as maintain the correct distance between the laser head and the tray.

Manufactured trays that have uniform wall thicknesses, i.e., variations within the wall of a single side of the tray or in tray to tray wall thicknesses of not more than ±1 mil, may not require a thickness measuring device for reproducible laser microperforating. However, wall thicknesses among the same lot of trays can typically vary by ±3 mils or more, and thickness variations within a single tray can be as large as 2 mils.

Figure 4A:
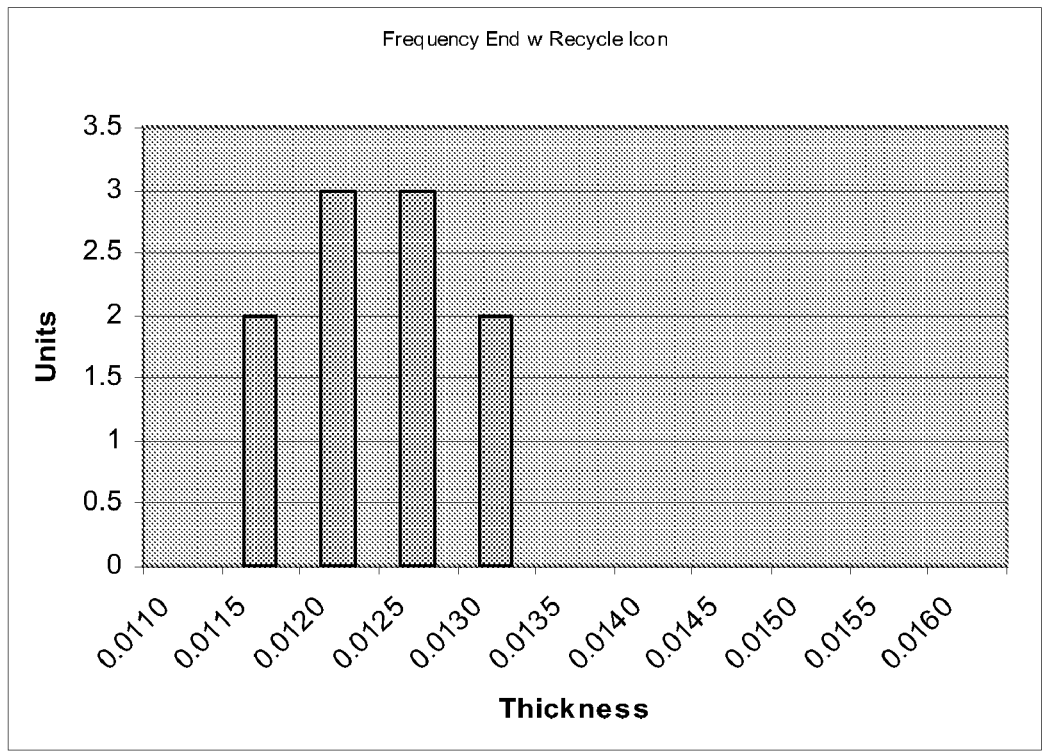
FIGS. 4A and 4B show examples of frequency histograms showing variations in tray wall thickness within a single batch of polyester trays.
Figure 4B:
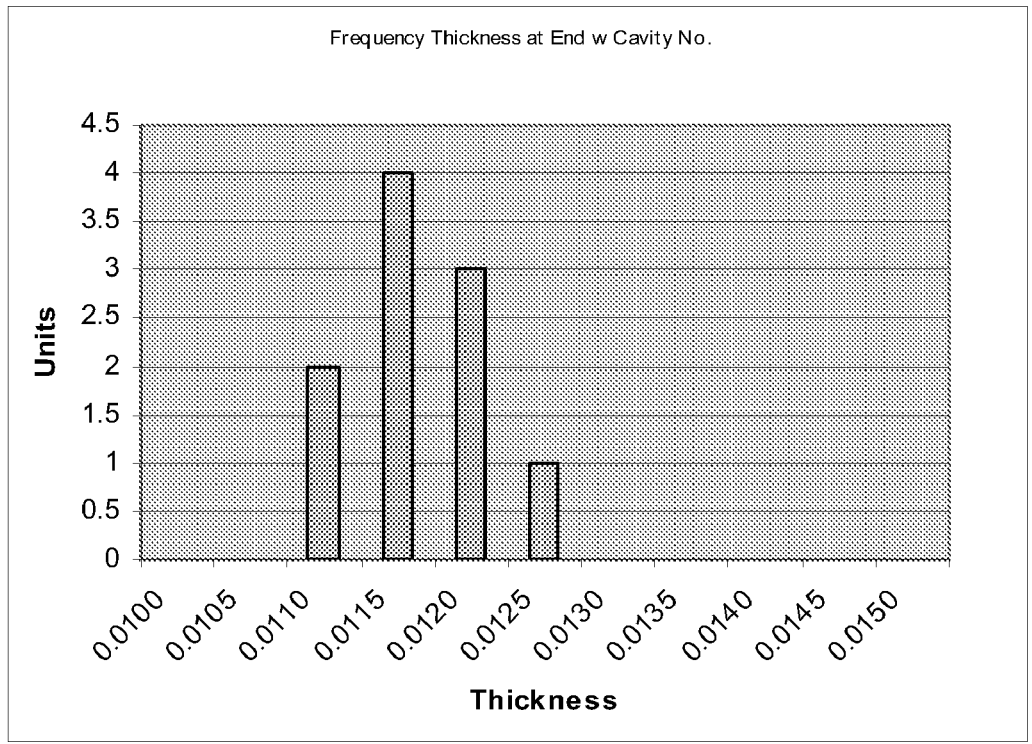

FIG. 4A shows the measured variation in wall thickness among trays of a single lot within a 2" flat area on one side of the tray at the end with the embossed recycle icon. FIG. 4B shows the variation in wall thickness among trays within a 2" area on one side of the tray at the end with the cavity number. Referring to FIG. 4A, the wall thickness in this small area ranged from about 11.5 mils to almost 13.5 mils and as noted in FIG. 4B, on the opposite side of the trays, thickness varied from about 11 mils to 12.5 mils. Therefore, for certain applications, it will be necessary to use a thickness measuring device and input linked to the laser output to minimize variability in laser perforation sizes.

A wide range of tray shapes and sizes can be microperforated according to the present invention. For example, the present laser microperforating system works on preformed trays that require a heat-sealable lidding film, small two-piece trays for packaging one fresh produce item, or small and large 2-piece party trays that have multiple compartments in a semi-rigid dome and are mechanically sealed to an interlocking flat tray. For trays having both a semi-rigid top and bottom, either portion (top or bottom) can be microperforated.

Figure 5A:
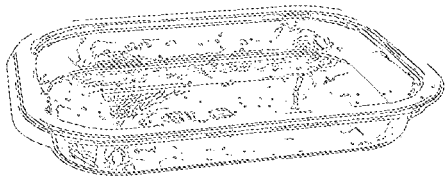
FIGS. 5A-5F illustrate examples of some semi-rigid trays that can be microperforated according to the present invention.

FIG. 5A is a tray with a heat-sealable lidding film that can have the microperforations drilled into any of the sides or bottom surface of the tray. While normally microperforations on the bottom surface would be blocked when trays are stacked, there may be recessed areas on the bottom surface wherein the microperforations can be placed in the recessed area, thus preventing microperforation occlusion during stacking. The tapered sidewalls generally are free from blockage problems even when stacked, however recessed areas can also be made on the tray sides to prevent microperforation occlusion during tray case-cartoning.

Figure 5B:
Figure 5C:
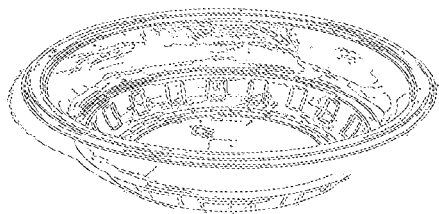

Referring to FIG. 5B, the tray is a plastic cup with a domed cover. Both cup and cover can be microperforated using the method described herein. FIG. 5C is a rounded tray sealed with a heat sealing film that can have microperforations located on the flat areas of the sidewalls, or on the bottom of the tray, provided there is a recessed area in the bottom.

Figure 5D:
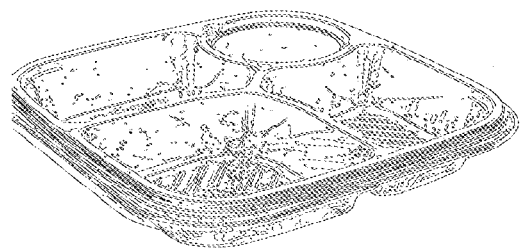

A multi-compartment tray is shown in FIG. 5D, wherein the tray is sealed with a heat-sealable lidding film. The microperforations can be located on the sides in any of the compartments that hold the respiring food. In one embodiment, certain compartments can have a different number of microperforations, or no microperforations at all, depending upon the contents within the domed compartment. In another embodiment the microperforations are located in a region that has atmospheric coupling to each of the other compartments. For example, about the inner portion that separates the compartments wherein there can be channels allowing air flow among the compartments within the tray.

Figure 5E:
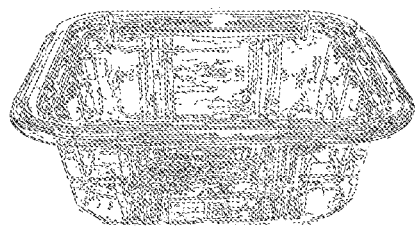

FIG. 5E illustrates a single compartment tray with an interlocking lid, wherein the microperforations can be drilled not only on the sides but also on the semi-rigid lid. As previously noted, microperforations on the bottom surface are also possible provided that there are channels that can allow the free flow of gas ($O_2$, $CO_2$, $N_2$) into and out of the tray via the microperforations. Design features such as stand-offs, feet, rim, or channels would help to prevent microperforations from being occluded when they are placed into the bottom of the tray.

Figure 5F:
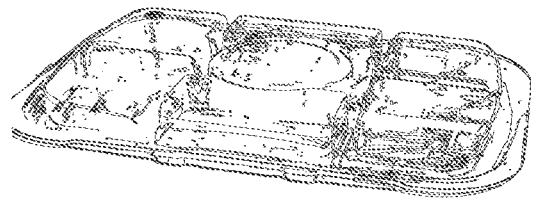

The tray in FIG. 5F consists of a clear dome with multiple compartments and a serving tray that interlocks with the dome. Trays such as these, whether rectangle, square, or round, are designed to be displayed with the dome side up. Microperforations can be targeted in any of the outer walls that make up the dome compartments or, as noted herein, they could be placed in a recessed area on top of the dome or on the serving tray that interlocks with the dome. In the latter case, the serving tray would be the only closure for the dome, i.e., the dome would not be sealed with a heat-sealable lidding film.

Figure 6:
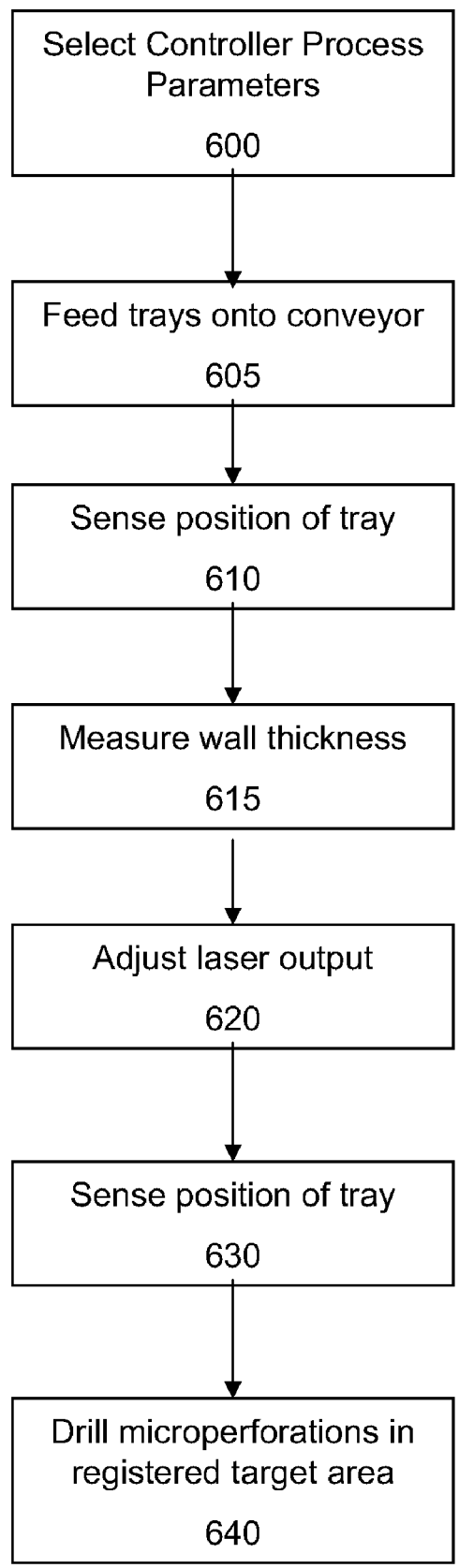
FIG. 6 is a flow chart perspective of the processing of the microperforated trays according to one embodiment.

Referring to FIG. 6, a flowchart according to one embodiment is depicted. The selection of controller process parameters can be input and processed by the system 600. The trays are fed or otherwise placed onto the conveyor 605. As described herein, there are various pick-and-place machines and denesters that automate the feed process and ensure that a tray is properly placed on the conveyor. A position sensor can be used to detect the tray 610 and trigger the thickness measuring device. The wall thickness is then measured 615 which can be done for each tray, a lot of trays, or a sampling.

The tray wall thickness information can be used by the controller to adjust the output for the laser drilling process 620. A position sensor can be used 630 to trigger the laser system to fire and drill the microperforations 640 and ensures that the placement of the holes is in the target area. This position sensor may not be needed if the placement of the trays on the conveyor is otherwise determined to be correct when needed for the optional wall thickness measurement and the required laser drilling operations. For example, the system may rely on accurate initial placement, the speed of the conveyor is kept constant, and the controller is programmed to activate the firing of the laser at a predetermined selected distance, i.e., the laser fires by distance as an alternative to firing when signaled by a sensor.

The microperforations can be registered in a small area on the tray wall by linking the laser drilling process to the signal from the thickness measuring device and to any position sensors mounted on the conveyor. Certain features such as the number of microperforations, the size of the microperforations (determined by setting the laser output), the location of the microperforations, and the pattern and distance between microperforations can be selected or pre-selected by dialing in the specific options given on the controller. In one embodiment, the laser drills the requested number of holes in a single row in the desired location on the tray. Microperforation size is determined by the spot size limitation of the laser bean and the laser pulse time wherein, for the same tray wall thickness, longer laser pulse times give larger hole sizes while shorter pulse times give smaller hole sizes. Table 2 of FIG. 7B presents data on the effects of laser output on microperforation hole size.

In one embodiment, a quality control check is implemented proximate the conveyor to confirm or otherwise check that the tray is properly microperforated. Such quality control ensures a higher quality that can effect reputation as well as lower liability issues for packagers.

Figure 8:
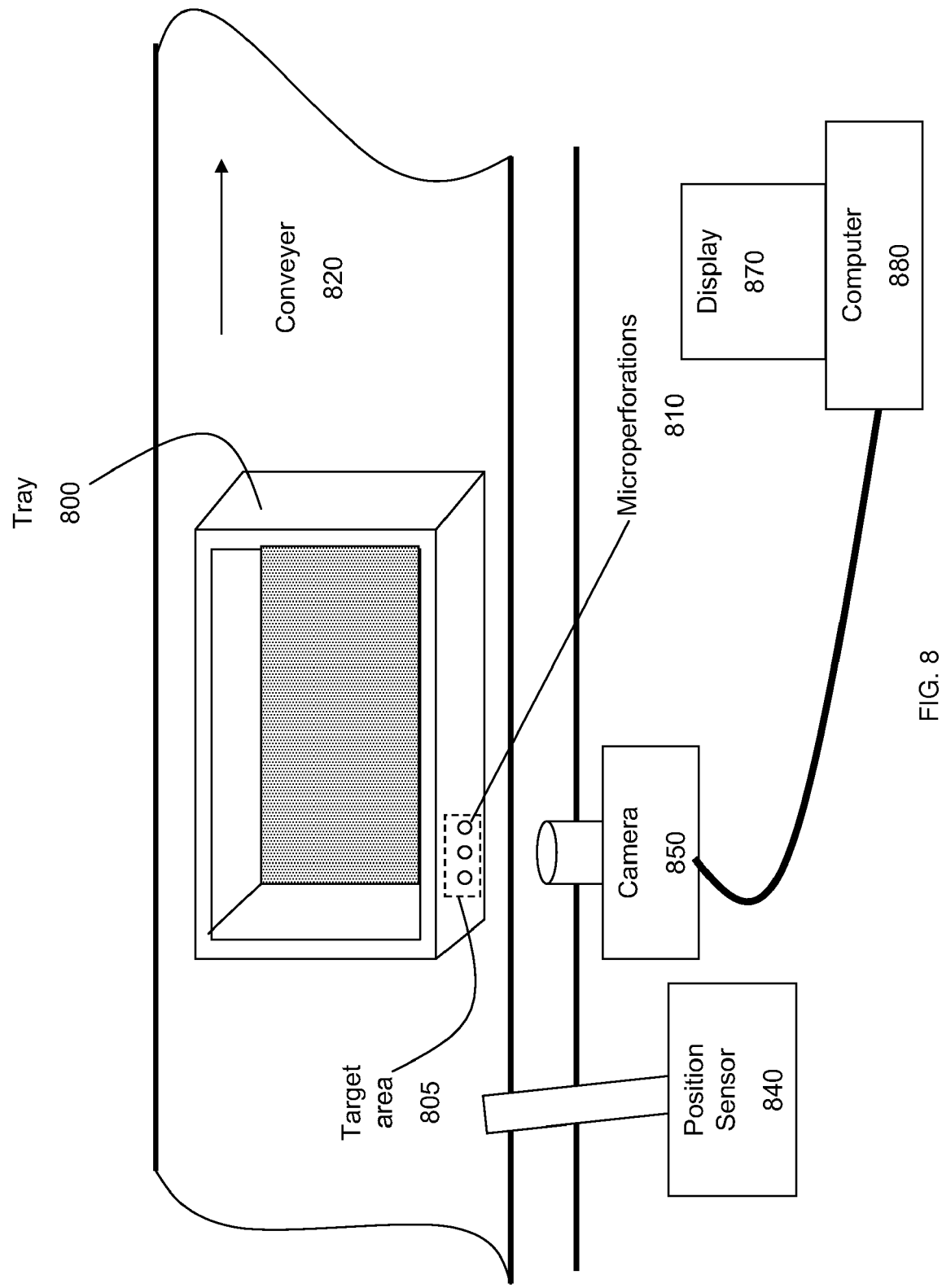
FIG. 8 is a block diagrammatic perspective for a quality control system for measuring hole sizes and is coupled to the conveyor according to one embodiment of the invention.

Referring to FIG. 8, a high resolution camera 850 takes an image of the target region 805 of the tray 800. A processing unit such as a computer 880 processes the image to confirm that the correct number of holes 810 was drilled, that the microperforations 810 went completely through the tray 800 wall, and that the microperforations 810 were within the target area 805 in a properly spaced relationship. The controller for the laser can also serve as the processing unit.

In operation according to this embodiment, after the tray has been microperforated by the laser (not shown), an imaging system 850 is triggered to take an image of the tray 800. This can be captured while the tray 800 is on the conveyor 820 or as part of or after the removal of the tray 800 from the conveyor 820. One of the embodiments includes having the imaging system coupled with the laser system or with the accumulator. A position sensor 840 can be used to trigger the camera. However, the imaging system 850 can also serve as the trigger mechanism itself. The image can be viewed on a display 870 in one embodiment. In another embodiment, software can process the image for the required details.

Figure 9:
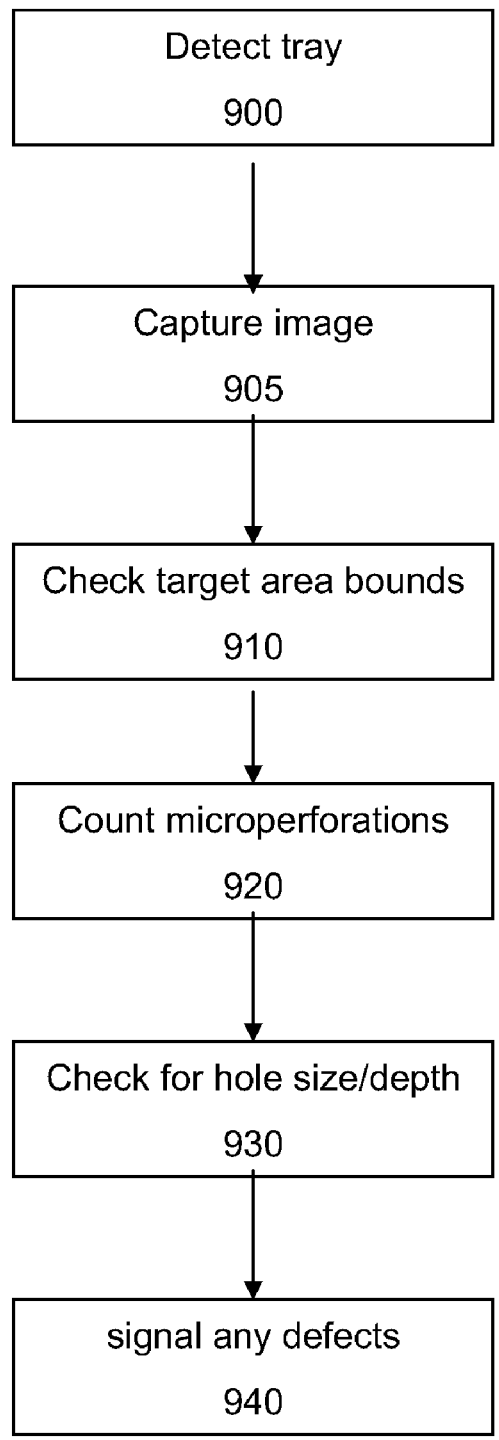
FIG. 9 is a flow chart for steps in the quality control for the tray microperforation according to one embodiment of the invention.

FIG. 9 shows a simplified quality control flow chart according to one embodiment of the invention. Subsequent to the laser microperforation, the location of the tray is detected 900 such as by the imaging system or a position sensor. An imaging system captures an image 905, which can be a single snapshot, a series of snapshots or a continuous image. The image is checked to determine that the microperforations are within the target area 910. The number of microperforations is counted 920 and further aspects such as the hole size as well as depth 930 can be checked. The depth of the hole can be a simple verification that the microperforation went completely through the tray wall. If there are any errors related to the tray microperforations, an error indication is noted 940. The operator can be notified to pull the tray that failed. The system may also have an automated mechanism in response to an error indication, to mark and/or remove the tray or stop processing in order to ensure that the trays that are shipped have all passed the quality control provisions.

Such a quality control check can be automated and processed automatically by the system controller software for every tray or otherwise, such as by a lot sample, or a certain sampling rate. Alternatively, the operator can view the image on a screen display and check for any faulty trays. Such imaging systems are known to those in the art and may include a position sensor as a trigger for the image capture. QC data may be collected, reported, and/or communicated to other terminals or monitoring systems, all as is well understood.

In another embodiment, instead of a stationary laser head, a laser with a galvanometer that allows for two-axis beam scanning can be linked to the conveyor to microperforate trays for fresh produce applications.

With a beam scanner, the microperforations can be drilled in a variety of different patterns or arrays, e.g., straight lines, rectangles, squares, and circles. While the most time-efficient method is typically to place the microperforations in a straight line or square, there may be other functional considerations or a commercial marketing advantage to using other shapes or designs on the tray. If microperforations are placed in a square or a rectangular array, the most time-efficient drilling generally occurs when the laser follows a serpentine pattern that provides the shortest total path from first to last hole.

In a further embodiment, if more than one area of the same semi-rigid tray must be microperforated to provide the necessary $O_2$ Flux, then the controller can be programmed so that the laser will microperforate more than one area along the same side of the tray. This can be accomplished by microperforating at specific distances along the length or width of the trays rather than by using position sensors. Alternatively, an additional laser can be co-located proximate the conveyor and both lasers can operate on the same tray, including simultaneous drilling on different areas. Multiple lasers can also be used to drill holes in trays positioned side-by-side across the conveyor width, and thus, increase the number of trays that can be processed per minute.

In addition, if more than one semi-rigid tray needs to be microperforated at the same time, multiple lasers (not shown) can be mounted at the conveyor or a beam splitter can be used to split the beam from one laser to multiple delivery heads. Beam splitters are well known in the art and the controller would process the required drilling requirements to simultaneously drill the microperforations.

A multi-head laser that drills the correct number of holes concurrently, is within the scope of the invention and should not need an illustration to be understood. Also, as is well known in manufacturing operations, other tray handling mechanisms including robots can function as an alternative or a supplement to a conveyor based system for tray transport and positioning. For example, in the context of the invention, a robot may be utilized for denesting, tray transport, positioning of the tray for the optional wall thickness measurement, for laser drilling operations, and for QC checks. Use of a supplement tray handling mechanism or a robot for positioning for the laser drilling may include capability for indexing of the tray position such that a stationary laser or lasers can be used.

The type of fresh produce to be packaged, the weight of the produce, the respiration rate of the produce, and the expected storage temperatures determine microperforation size and the number of microperforations required in each produce-specific semi-rigid tray. In one embodiment, microperforation sizes range from about 110 to 180 microns. However, sizes up to 400 microns may be needed for some fresh produce applications where high MVTR is required. As the perforation size increases the $O_2$ flux of the perforation also increases. At any specified microperforation size, $O_2$ flux increases with increasing number of microperforations.

The laser power and pulse time as well as the speed of the conveyor and/or tray handling mechanisms are factors that can be used to determine the size and shape of the microperforations. For example, faster conveyor speeds tend to result in more elongated microperforations.

A range of $O_2$ Fluxes that can be created by registering microperforations, in semi-rigid trays by the laser methods described herein. Although microperforated trays, according to the present invention, can be made with an $O_2$ Flux ranging from about 150 cc/day-atm to over 5,000,000 cc/day-atm, a typical range is about 200 to 1,500,000 cc/day-atm for controlling or modifying the atmosphere inside trays containing from 15 g to 5 kg of fresh produce. The $O_2$ Flux of the microperforations is not dependent on the thickness of the tray material that is microperforated.

The number and size of microperforations required in a particular tray is typically dependent on the type and weight of fresh produce to be packaged, the respiration rates of those produce items, and the expected storage and distribution temperatures that the packages will see. U.S. Pat. Nos. 6,441,340, 6,730,874, and 7,083,837 which are incorporated in their entirety by reference, teach one system for the calculation of the size and number of microperforations needed to establish a desired atmosphere inside a package containing fresh fruit, fresh vegetables, fresh herbs, fresh flowers or other biochemically active foods.

Microperforation arrays are normally positioned on a tray wall that shows low variability in wall thickness. Extreme wall thickness variability causes variations in microperforation sizes within a single array, which translates into variability in $O_2$ flux rates, and less consistency in fresh produce shelf life. In one embodiment a flat area of well-controlled thickness within the tray wall is designated as the placement area for microperforations.

Pre-formed semi-rigid trays can be made from a wide range of materials (polyester, polystyrene, polypropylene, polyvinyl chloride, polyethylene, polylactic acid, cellulose-based materials, and palm-based materials) and can be microperforated with this tray perforating laser system. Polymer materials have inherent physical/chemical characteristics, e.g. melting point and degree of crystallinity, that may impact the hole size and shape for any given laser power and pulse duration. At the same wall thickness, trays made from polypropylene are harder to drill and thus require either higher powered lasers or longer pulse times than trays made from polyester.

According to one embodiment, tray thicknesses in the range of 6 mils or less, to 25 mils or more, can be microperforated. The required laser power is dependent on tray thickness and desired run speed, i.e., the number of trays microperforated per minute.

The invention described herein outlines systems and methods to laser microperforate trays, such as semi-rigid trays. This includes a system to microperforate pre-formed trays at the produce packer site. Such a system allows the produce packer the flexibility to change the $O_2$ flux of the trays depending on the fresh produce items desired in the tray. Furthermore, the need for microperforated lidding film for heat-sealing the contents in the tray is eliminated by microperforating the tray rather than the lidding film. This helps to reduce the produce packer's inventory of costly microperforated lidding film.

Other variations and examples within the scope of the invention will be readily apparent to those skilled in the art. For example, a single conveyor belt may be configured to run left and right side lines of trays and have respective left and right side dedicated measurement systems and lasers. Multiple conveyor lines or robots may be ganged in ways commonly understood for higher volume production. A conveyor system may be vertically oriented with an upward or downward flow of trays passing by measurement, laser and quality control stations. Various embodiments of the invention may be incorporated into tray forming lines or ahead of the actual tray filling station in a tray filling and closing line, or in a fully automated forming, perforating, filling, and closing line.

The invention is susceptible of further embodiments as well. For example, there are methods and systems for laser microperforating semi-rigid trays for respiring produce, that include: measuring a wall thickness of one or more trays; processing a laser output requirement for laser drilling a microperforation of a predetermined diameter in a wall of each tray based on the wall thickness; adjusting a laser to the laser output requirement; and drilling at least one microperforation in at least one wall of each tray. The method may further include calculating a microperforation specification for the trays based on common characteristics of the trays and a type and the amount of the respiring foods for which the trays are intended, whereby a storage life of the type and amount of the respiring food when stored in the tray is extended.

The microperforation specification may include a number and diameter of microperforations. The drilling may be done according to the microperforation specification. Measuring of wall thickness may mean measuring a wall thickness of one, or a sampling or at a sampling rate, or of each of the trays being drilled. There may be inspecting of one or a sampling or of all trays after drilling, for the presence, size, and/or number of one or more microperforations. The systems and methods may include transporting trays sequentially from a source of trays to a means for measuring wall thickness and hence to a means for laser drilling and hence to a next tray destination, whatever it may be.

The systems and methods may include as a preliminary step, means for pressing or forming the trays from suitable tray stock, in a tray die or otherwise. Methods and systems of the invention may also include an inspection station configured for inspecting drilled trays for the presence of the required microperforations and for emitting a signal to the system and/or system operator upon the absence thereof. The inspection station may be coupled to the controller, which may be programmed to cause a system interruption or alteration upon the occurrence of such a signal.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A laser method for microperforating semi-rigid trays for modified atmosphere packaging of respiring produce, the trays being pre-formed by injection molding, or by a thermoforming process that includes pressing or forming the trays from suitable tray stock in a tray die or otherwise, the method comprising:
    selecting a target area that is common to the walls of all of the plurality of semi-rigid trays, the target area in each tray being substantially uniform in wall thickness;
    measuring a wall thickness of the target area of at least one of the plurality of trays;
    processing a laser output requirement for laser drilling a microperforation in the target area of a predetermined diameter based on the wall thickness;
    adjusting a laser to said laser output requirement; and
    drilling with said laser at least one said microperforation in the target area of at least one of said plurality of trays.

2. A laser method according to claim 1, said processing a laser output requirement comprising computing a laser power level based on said wall thickness.

3. A laser method according to claim 1, said method further comprising:
    calculating a specification for a set of microperforations for said trays based on data comprising common characteristics of said trays and a type and amount of said respiring foods for which said trays are intended, whereby said set of microperforations controls and maintains atmosphere conditions within specified oxygen and carbon dioxide concentrations, the oxygen concentration of said atmosphere conditions being less than 20.9% and the carbon dioxide concentration of said atmosphere conditions being greater than 0.03%, said atmosphere conditions being suitable for said type and amount of respiring foods;
    said microperforation specification comprising a number and diameter of microperforations;
    said drilling at least one said microperforation comprising drilling according to said microperforation specification.

4. A laser method according to claim 1, said measuring a wall thickness of the target area of at least one of said plurality of trays comprising measuring a wall thickness of the target area of each of said plurality of trays.

5. A laser method according to claim 1, said measuring a wall thickness of the target area of at least one of said plurality of trays comprising measuring a wall thickness of the target area of a sampling of said plurality of trays.

6. A laser method according to claim 1, said measuring a thickness of the target area of at least one of said plurality of trays comprising measuring a wall thickness at a pre-determined sampling rate of said plurality of trays.

7. A laser method according to claim 3, said method further comprising:
    inspecting the target area of at least one of said plurality of trays after said laser drilling for the presence of at least one said microperforation.

8. A laser method according to claim 7, said inspecting the target area of at least one of said plurality of trays comprising inspecting for a presence of the number and diameter of microperforations according to the microperforation specification.

9. A laser method according to claim 1, said method further comprising:
    transporting said trays sequentially from a source of said trays to a thickness measuring device that is able to perform said measuring of said wall thickness and hence to a laser drilling system that is able to perform said laser drilling and hence to a destination.

10. A laser method according to claim 9, said transporting comprising sensing a position of said trays at said thickness measuring device.

11. A laser method according to claim 9, said transporting comprising sensing a position of said trays at said laser drilling system.

12. A laser method according to claim 9, said method first comprising:
   forming said plurality of trays.

13. A laser method according to claim 1, wherein said laser is a $CO_2$ laser.

14. A laser method according to claim 3, executed on a system, comprising:
   a thickness measuring device for measuring a wall thickness in the target area of a said tray;
   a laser system for drilling microperforations in the target area of a said tray; and
   a controller coupled to said thickness measuring device and said laser system whereby a laser power setting is adjusted proportionally to said wall thickness and said type and amount of said respiring foods for which said trays are intended.

15. A laser method according to claim 14, said system further comprising:
   transporting system that is able to transport said trays sequentially from a source of said trays to said thickness measuring device and hence to said laser system and hence to a destination for microperforated said trays, said transporting system being coupled to said controller, said controller being programmed whereby the target area of at least one tray is measured for wall thickness, said laser is adjusted proportionally, said tray is transported to said laser system, and microperforations in the target area of said tray are drilled at the adjusted said laser power setting.

16. A laser method according to claim 15, said system further comprising:
   a position sensor for sensing a tray in position at said thickness measuring device.

17. A laser method according to claim 15, said system further comprising:
   a position sensor for sensing a tray in position at said laser system.

18. A laser method according to claim 15, said transporting system comprising a denester, a conveyor, and an accumulator.

19. A laser method according to claim 15, said system further comprising:
   an inspection station configured for inspecting a perforated said tray for a presence of microperforations and emitting a signal upon the absence thereof; said transporting system comprising a system for transporting said trays from said laser system to said inspection station and hence to said destination.

20. A laser method according to claim 14, wherein the thickness measuring device comprises a mechanical arm and an inductive sensor.

21. A laser method according to claim 14, wherein the thickness measuring device comprises an optical device.

22. A laser method according to claim 1, said processing a laser output requirement comprising computing a laser drilling time based on said wall thickness.

23. A laser method according to claim 1, wherein the target area is substantially flat.

24. A laser method according to claim 1, wherein the target area is substantially perpendicular to a head of the laser.

* * * * *